United States Patent
Kim et al.

(10) Patent No.: US 8,224,292 B2
(45) Date of Patent: Jul. 17, 2012

(54) APPARATUS FOR SENSING SMART-CARD IN DUAL MODE PORTABLE TERMINAL AND METHOD THEREOF

(75) Inventors: Jin Kim, Suwon-si (KR); Dong Cheol Park, Suwon-si (KR)

(73) Assignee: Samsung Electornics Co., Ltd., Suwon-si (KR)

( * ) Notice: Subject to any disclaimer, the term of this patent is extended or adjusted under 35 U.S.C. 154(b) by 423 days.

(21) Appl. No.: 12/534,498

(22) Filed: Aug. 3, 2009

(65) Prior Publication Data

US 2010/0035579 A1 Feb. 11, 2010

(30) Foreign Application Priority Data

Aug. 11, 2008 (KR) .................. 10-2008-0078574

(51) Int. Cl.
*H04M 1/66* (2006.01)
(52) U.S. Cl. ..................... 455/411; 455/558
(58) Field of Classification Search .............. 455/411, 455/558, 414.1–414.4, 463
See application file for complete search history.

(56) References Cited

U.S. PATENT DOCUMENTS

| | | | |
|---|---|---|---|
| 7,146,180 B1 * | 12/2006 | Liu ........................ | 455/465 |
| 7,706,839 B2 * | 4/2010 | Ueno ...................... | 455/558 |
| 2005/0148366 A1 * | 7/2005 | Okada ..................... | 455/558 |
| 2005/0176466 A1 * | 8/2005 | Verloop et al. ............. | 455/558 |
| 2006/0234693 A1 * | 10/2006 | Isidore et al. ............. | 455/422.1 |
| 2008/0003982 A1 * | 1/2008 | Gushiken .................. | 455/411 |
| 2008/0020773 A1 * | 1/2008 | Black et al. ............... | 455/445 |
| 2008/0064443 A1 | 3/2008 | Shin et al. | |
| 2009/0061932 A1 * | 3/2009 | Nagarajan ................. | 455/558 |
| 2009/0088211 A1 * | 4/2009 | Kim ....................... | 455/558 |
| 2009/0131054 A1 * | 5/2009 | Zhang ..................... | 455/436 |
| 2010/0035577 A1 * | 2/2010 | Rager et al. ............... | 455/411 |
| 2010/0099381 A1 * | 4/2010 | Nakama .................... | 455/411 |
| 2010/0130254 A1 * | 5/2010 | Kamada et al. ............. | 455/558 |
| 2010/0317403 A1 * | 12/2010 | Mizuo ..................... | 455/558 |
| 2011/0195751 A1 * | 8/2011 | Atley et al. ............... | 455/558 |

FOREIGN PATENT DOCUMENTS

| | | |
|---|---|---|
| DE | 101 38 835 A1 | 2/2003 |
| KR | 10-2004-0003222 A | 1/2004 |
| KR | 10-0811521 B1 | 3/2006 |
| KR | 10-2006-0038576 A | 5/2006 |
| KR | 10-0793093 B1 | 1/2008 |

OTHER PUBLICATIONS

Teltarif, Erster Eindrucke: Mit dem Dual-SIM-Handy unterwegs, Internet Citation, Mar. 14, 2007, pp. 1-9.

* cited by examiner

*Primary Examiner* — Kamran Afshar
*Assistant Examiner* — Khawar Iqbal
(74) *Attorney, Agent, or Firm* — Jefferson IP Law, LLP

(57) ABSTRACT

An apparatus and method for sensing a smart card in a dual mode portable terminal are provided. The apparatus includes a plurality of smart card modules including identification information for receiving a specific wireless communications protocol, and at least two communications modules for performing wireless communications according to a connected smart card module among the plurality of smart card modules, wherein any one of the at least two communications modules connected to a smart card module having preset identification information is set as a master device.

14 Claims, 4 Drawing Sheets

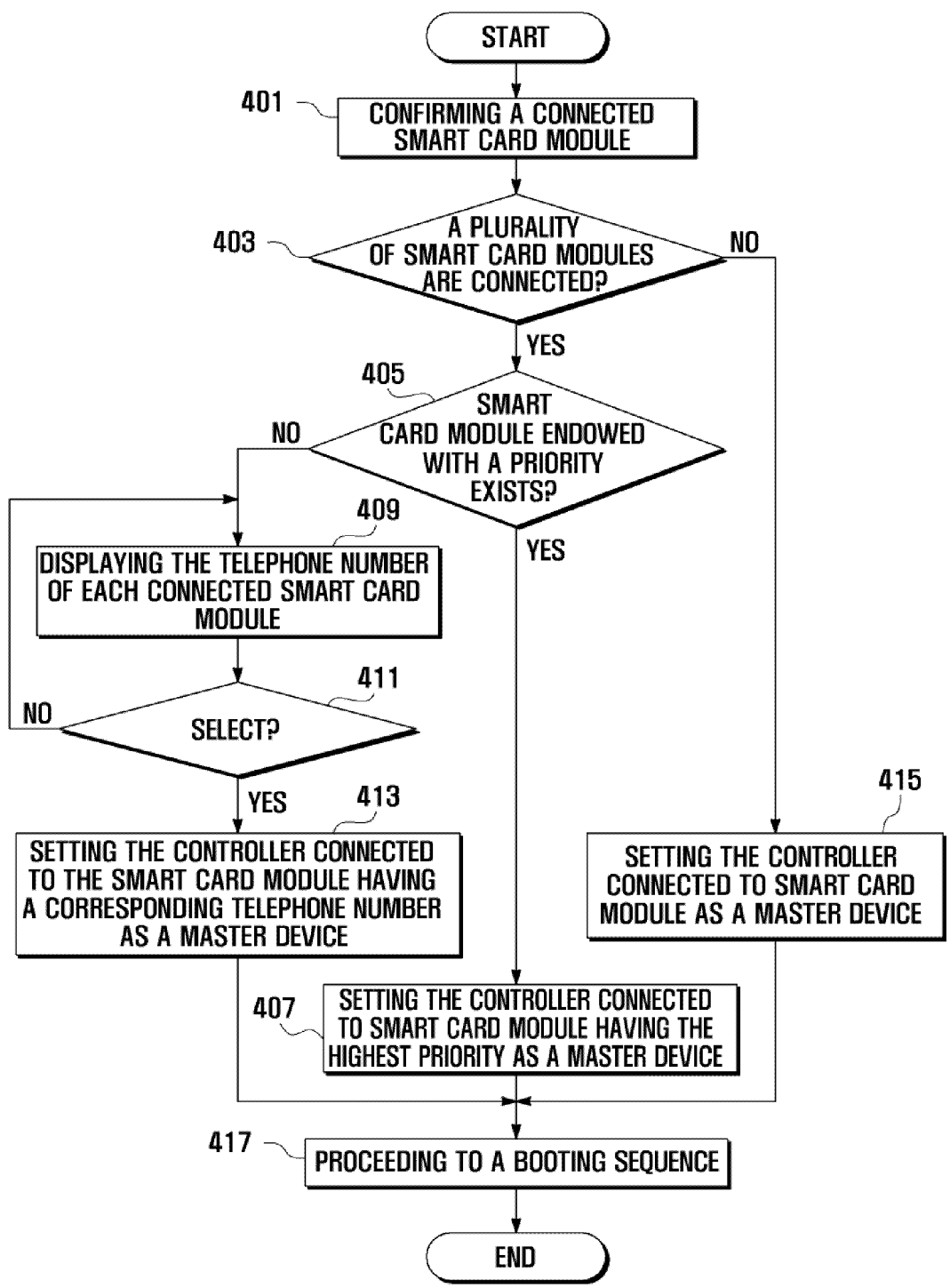

APPARATUS FOR SENSING SMART-CARD IN DUAL MODE PORTABLE TERMINAL AND METHOD THEREOF

PRIORITY

This application claims the benefit of a Korean patent application filed in the Korean Intellectual Property Office on Aug. 11, 2008 and assigned Serial No. 10-2008-0078574, the entire disclosure of which is hereby incorporated by reference.

BACKGROUND OF THE INVENTION

1. Field of the Invention

The present invention relates to an apparatus for sensing a smart card in a dual mode portable terminal and method thereof. More particularly, the present invention relates to an apparatus and method for sensing a smart card that determines a master device according to a connected smart card in a portable terminal having two or more modes.

2. Description of the Related Art

As portable terminals become widely used, various functions are being added to the portable terminals. Recently, dual mode portable terminals which can use a communications network according to two or more wireless protocols have been introduced. When using a portable terminal that supports a specific wireless telecommunications system, communications are only available in a service area of corresponding wireless telecommunications system. However, in a case of a dual mode portable terminal, for example, a Code Divisional Multiple Access (CDMA) system and a Global System for Mobile Communications (GSM), communications are available in a CDMA service area and a GSM service area, which increases communications availability. In a case of a conventional dual mode portable terminal, a system mode conversion is performed through a menu operation after the portable terminal completes a booting process and enters an IDLE mode. As a result, manipulation becomes complicated and a lot of time is required for mode switching. Accordingly, a dual standby portable terminal has been suggested. The dual standby portable terminal is a dual mode portable terminal that simultaneously supports both modes of GSM and CDMA. That is, in the case of the dual standby portable terminal, when receiving a call of another module during the use of one module, the mode is automatically converted to receive the call of another module. In the case of the portable terminal having two or more modes, communications are performed by using a telephone number stored in a smart card according to a connected smart card. However, the master device is determined based on the order of the smart card mounting. Therefore, the smart card should be initially mounted after the smart card that has a frequently used telephone number is confirmed. When the smart card having a telephone number which is not frequently used is mounted and booted, re-mounting of the smart card can be an inconvenience.

Therefore, a need exists for an apparatus and method for sensing a smart card that determines a master device without re-mounting the smart card.

SUMMARY OF THE INVENTION

An aspect of the present invention is to address at least the above-mentioned problems and/or disadvantages and to provide at least the advantages described below. Accordingly, an aspect of the present invention is to provide an apparatus and method for sensing a smart card capable of determining a master device according to the intention of a user regardless of the order of the smart card mounting.

In accordance with an aspect of the present invention, an apparatus for sensing a smart card of a portable terminal is provided. The apparatus includes a plurality of smart card modules including identification information for receiving a specific wireless communications protocol, and at least two communications modules for performing wireless communications according to a connected smart card module among the plurality of smart card modules, wherein one of the at least two communications modules connected to a smart card module having preset identification information is set as a master device.

One of the at least two communications modules is selected by a user as a master device, when a communications module connected to a smart card module for storing preset identification information does not exist.

One of the at least two communications modules connected to a smart card module having a high preset priority is set as a master device.

One of the at least two communications modules is selected by a user as a master device, when a communications module connected to a smart card module having a high preset priority does not exist.

A common module is directly connected to at least one of the at least two communications modules, for performing input and output interfacing according to the control of the communications module which is set as a master device.

In accordance with another aspect of the present invention, a method for sensing a smart card of a portable terminal having at least two communications modules is provided. The method includes confirming a smart card module connected to the at least two communications modules when a power supply of portable terminal is turned on, determining whether a smart card module having preset identification information exists among the connected smart card module, and determining that a communication module connected to the smart card module having preset identification information is a master device, when the smart card module having preset identification information exists.

A communications module selected by a user is set as a master device, when the smart card module having preset identification information does not exist.

In accordance with still another aspect of the present invention, a method for sensing a smart card of a portable terminal having at least two communications modules is provided. The method includes confirming a smart card module connected to the at least two communications modules when a power supply of portable terminal is turned on, determining whether a smart card module having a preset priority exists among the connected smart card module, and determining that a communication module connected to the smart card module having the highest priority is a master device, when the smart card module having a preset priority exists.

A communications module selected by a user is set as a master device, when the smart card module having a preset priority does not exist.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 4 is a flowchart illustrating a method for sensing a smart card of a portable terminal according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a portable terminal that includes two communications modules that support at least two wireless communications protocols, while each communications module is available for a dual standby. The portable terminal supports a dual mode dual band or more, and the dual standby.

Figure 1:
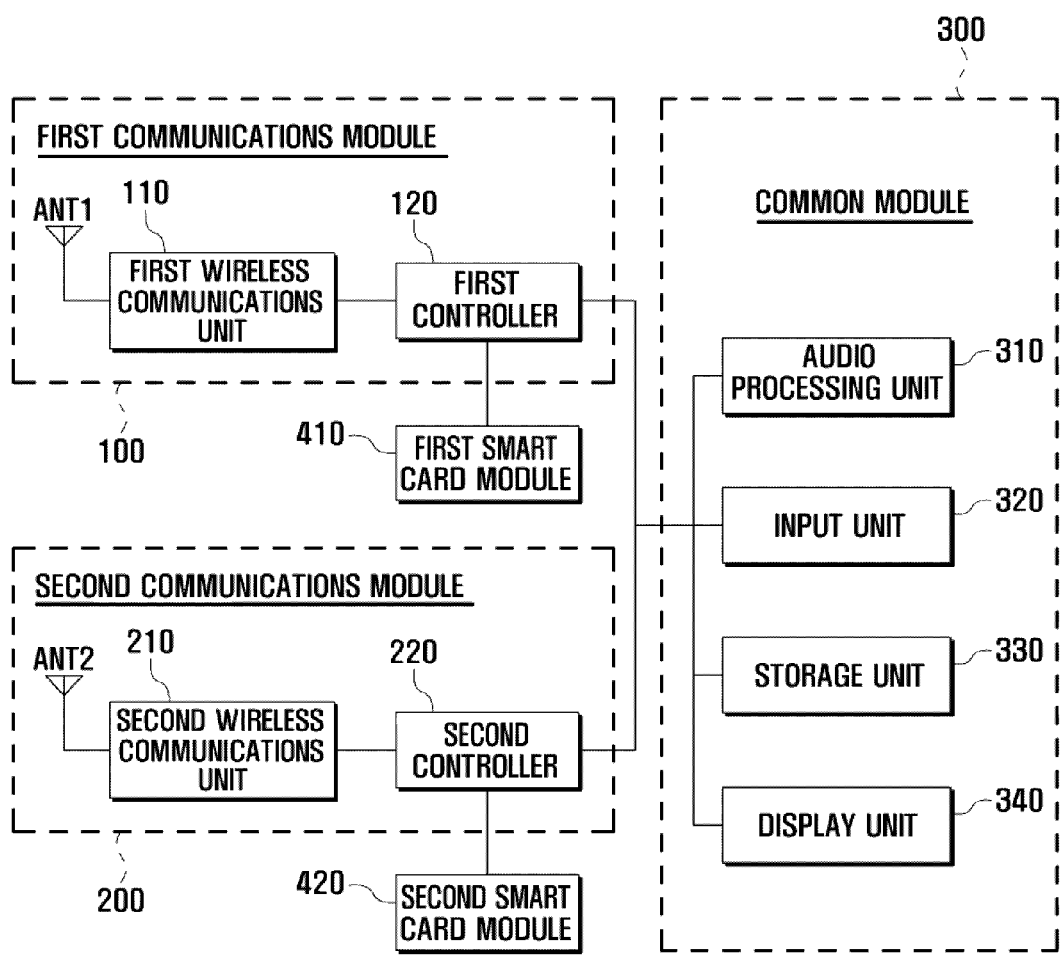
FIG. 1 is a block diagram illustrating a schematic configuration of a portable terminal according to an exemplary embodiment of the present invention.
Figure 2:
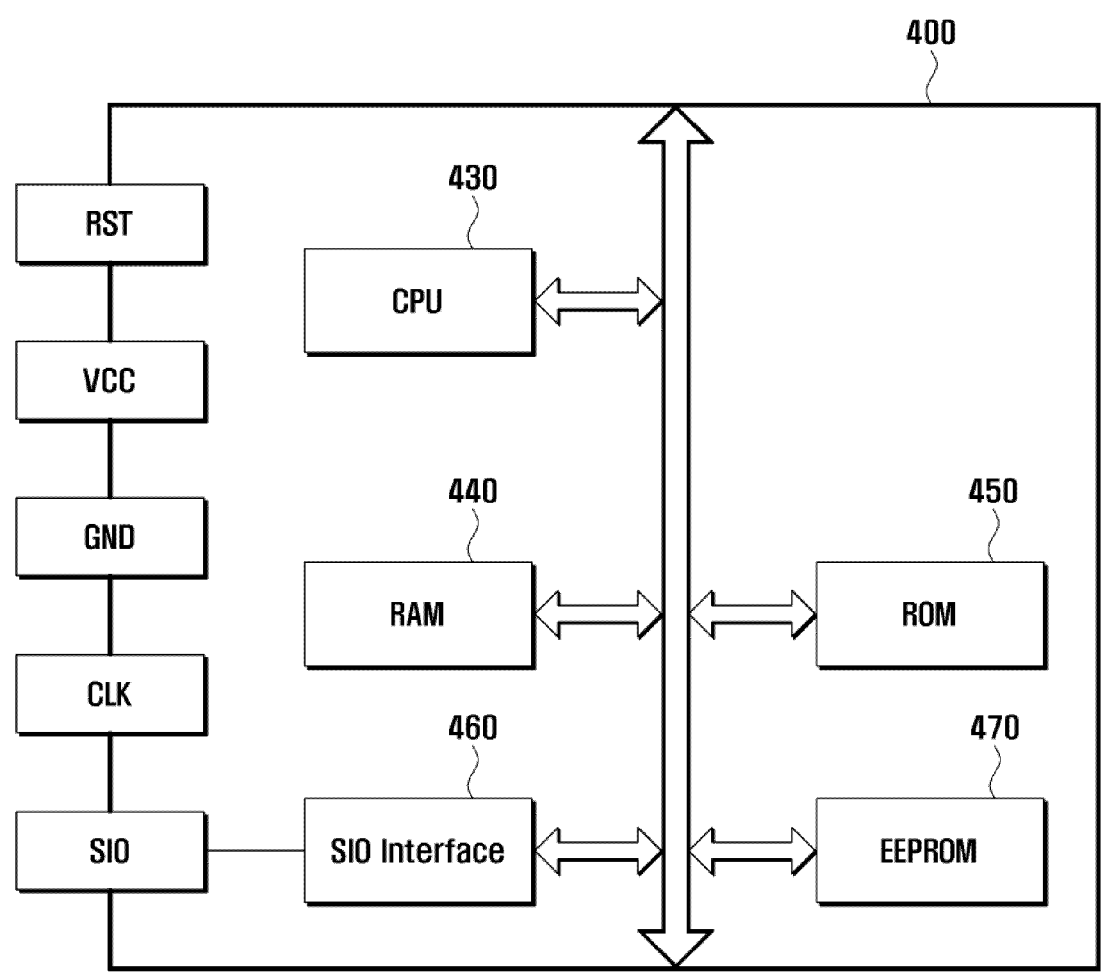
FIG. 2 is a block diagram illustrating a schematic configuration of a smart card module according to an exemplary embodiment of the present invention.

FIG. 1 is a block diagram illustrating a schematic configuration of a portable terminal according to an exemplary embodiment of the present invention, FIG. 2 is a block diagram illustrating a schematic configuration of a smart card module according to an exemplary embodiment of the present invention.

Referring to FIG. 1, the portable terminal includes a first communications module 100 that performs communications according to a specific wireless communications protocol, a second communications module 200 that performs communications according to a wireless communications protocol which is identical with or different from the wireless communications protocol that the first communications module 100 supports, and a common module 300 that provides an interface with a user by being directly connected to at least one of the first communications module 100 and the second communications modules 200.

The first communications module 100 and the second communications module 200 include a first smart card module 410 and a second smart card module 420, respectively, for connecting to a corresponding base station according to a wireless communications protocol that the first communications module 100 and the second communications module 200 provide, and for providing a service according to a corresponding wireless communications protocol. The first smart card module 410 and the second smart card module 420 are detachable from the first communications module 100 and the second communications module 200, respectively. More particularly, a wireless communications method is determined according to a communications method that the first smart card module 410 and the second smart card module 420 support.

The first smart card module 410 and the second smart card module 420 are distributed by a wireless communications service supplier that provides a wireless communications service according to a specific wireless communications protocol. The first smart card module 410 and the second smart card module 420 may have a device identifier to distinguish from other smart card modules. For example, the device identifier may be an Integrated Circuit Card Identification (IC-CID). Moreover, the smart card module 410 and the second smart card module 420 store a service identifier received from a service enterprise. For example, the service identifier may be a telephone number. The information, such as the device identifier and the service identifier, which is used in order to distinguish the first smart card module 410 and the second smart card module 420 from other smart cards, is known as "identification information".

The first communications module 100 and the second communications module 200 include a first wireless communications unit 110 and a second wireless communication unit 210, respectively. The first communications module 100 and the second communications module 200 also include a first controller 120 and a second controller 220, respectively, and may be connected to the first controller 120 and the second controller 220 by a user's manipulation among the first smart card module 410 and the second smart card module 420.

The first wireless communications unit 110 and the second wireless communication unit 210 perform communications by wirelessly transmitting and receiving signals including data, voice, images, and the like to other external portable terminals. The first wireless communications unit 110 and the second wireless communication unit 210 include a transmitting end (Tx) which converts a modulated signal received from a corresponding first controller 120 and second controller 220 into a high frequency signal, and amplifies and output the high frequency signal. The first controller 120 and the second controller 220 also include a reception end (Rx) which receives the high frequency signal, low-noise amplifies the received high frequency signal, successively converts the high frequency signal into a base band and provides the base band to the corresponding first controller 120 and second controller 220. The transmitting end (Tx) and reception end (Rx) may be changed according to a wireless communications protocol. The first wireless communications unit 110 and the second wireless communication unit 210 include a first antenna (ANT1) and a second antenna (ANT2), respectively, in the transmitting end (Tx) and receiving end (Rx). The ANT1 and the ANT2 transmit a high frequency signal having a frequency corresponding to each antenna, or receive a high frequency signal.

More particularly, the ANT1 and the ANT2 receive a high frequency signal of frequency according to a corresponding wireless communications protocol, or radiates the high frequency signal according to a corresponding frequency. The first controller 120 and the second controller 220 output corresponding signals, such as data, voice, images, and the like to the first wireless communications unit 110 and the second wireless communication unit 210. Moreover, the first controller 120 and the second controller 220 receive signals such as data, voice, images, and the like from a corresponding first wireless communications unit 110 and second wireless communications unit 210. The first controller 120 and the second controller 220 provide a voice signal, which is provided from an audio processing unit 310 in a voice signal processing for the wireless communications, to a corresponding first wireless communications unit 110 and second wireless communications unit 210 after converting and modulating the voice signal through coding and interleaving. Moreover, the first controller 120 and the second controller 220 outputs the voice signal that the corresponding first wireless communications unit 110 and second wireless communications unit 210 provide, to the audio processing unit 310 after demodulation, equalization, decoding and de-interleaving of the voice signal. To perform such a function, the first controller 120 and the second controller 220 may include a modem and a codec. Here, the codec includes a data codec which processes packet data, an audio codec which processes an audio signal, such as, voice signal, and a video codec which processes an image signal. The first controller 120 and the second controller 220 provides signaling between the transmitting end (Tx) and receiving end (Rx) when a call connection is performed.

That is, the first controller 120 and the second controller 220 transmit a message for the call setting through a channel prescribed in each wireless communications protocol, and provide a message for opening and expressing a logical channel. The first smart card module 410 and the second smart card module 420 may include a Subscriber Identity Module (SIM), a User Identity Item (UIM), and a Universal Subscriber Identity Module (USIM). The first smart card module 410 and the second smart card module 420 may perform an Integrated Circuit Card (ICC) function.

Moreover, the first smart card module 410 and the second smart card module 420 may be removably connected to the first communications module 100 and the second communications module 200, respectively, and may be directly connected to the first controller 120 and the second controller 220. The first smart card module 410 and the second smart card module may be a Universal Integrated Circuit Card (UICC). A schematic configuration of a smart card module 400 used as the first smart card module 410 and the second smart card module 420 is illustrated in FIG. 2.

Referring to FIG. 2, the smart card module 400 includes a storage unit, a calculation unit and an input and output interface unit. The smart card module 400 is connected to the first controller 120 or the second controller 220 through a different contact point.

Here, the storage unit includes a Random Access Memory (RAM) 440, a Read Only Memory (ROM) 450, and an Electrically Erasable Programmable Read-Only Memory (EEPROM) 470, and the calculation unit may include a Central Processing Unit (CPU) 430. Moreover, the input and output interface unit may be a Serial Input Output (SIO) Interface 460. Each device described above is connected through a data bus.

The smart card module 400 includes a power supply voltage (VCC), a ground voltage (GND), a clock signal (CLK), a reset signal (RST) and an Input Output (IO) or SIO as a contact point. The smart card module 400 is connected to the first controller 120 or the second controller 220 through each contact point. Each contact point is configured to be provided with the VCC, the GND, the CLK and the RST. Moreover, data or a control signal stored in the smart card module 400 is input and output through the IO or the SIO.

The first communications module 100 and the second communications module 200 are modules for performing a wireless communications according to a specific wireless communications protocol. For example, the first communications module 100 and the second communications module 200 are function modules that support at least one of various wireless communications protocols, such as, a Global System for Mobile communication (GSM) or a Code Division Modulation Access (CDMA).

A selection by which the first communications module 100 and the second communications module 200 may be operated as a function for the wireless communications protocol is made according to the first smart card module 410 and the second smart card module 420 connected to the first controller 120 and the second controller 220, respectively, of each module. Therefore, the first controller 120 and the second controller 220 include an interface for the connection of the first smart card module 410 and the second smart card module 420, respectively. For example, the first controller 120 and the second controller 220 include a contact point the VCC, the GND, the CLK, the RST and the IO or the SIO of the first smart card module 410 and the second smart card module 420. The first controller 120 and the second controller 220 determine a wireless communications method according to the connected first smart card module 410 and second smart card module 420 when each smart card module 410, 420 is connected.

That is, if a user who joined a service, which a business carrier of a wireless communications network provides, connects the first smart card module 410 and the second smart card module 420 that a corresponding enterpriser provides to the first controller 110 or the second controller 210, a corresponding first communications module 100 or second communications module 200 operates according to the wireless communications protocol which the corresponding enterpriser provides.

For example, if the first communications module 100 supports GSM and CDMA and the second communications module 200 only supports CDMA, the portable terminal may be used as a GSM-CDMA terminal or may be used as a CDMA-CDMA portable terminal according to the mounted first smart card module 410 and second smart card module 420. The communications protocol described in the exemplary embodiments of the present invention is not limited thereto. However, various wireless communications protocols may also be implemented.

Accordingly, the service identifier is embedded in the first smart card module 410 and second smart card module 420. Also, the first smart card module 410 and second smart card module 420 store data for authentication for a connection to a corresponding provider network for performing the wireless communications according to a corresponding wireless communications protocol, encoding, and tunneling for encoding. More particularly, the first smart card module 410 and second smart card module 420 store identification information for receiving a service from a corresponding wireless service provider network. For example, the identification information may be a telephone number.

The common module 300 includes the audio processing unit 310, an input unit 320, a storage unit 330 and a display unit 340. The common module 300 may input and output under the control of the first controller 120 or the second controller 220 which is a master device of the first communications module 100 and the second communications module 200. The audio processing unit 310 includes a speaker and a microphone. The audio processing unit 310 outputs a voice signal from the first controller 120 and the second controller 220 through the speaker, or transmits the voice signal input from the microphone to the first controller 120 and the second controller 220. The input unit 320 includes a plurality of input keys and function keys for receiving number or character information, and for setting up various functions. The function keys may include a direction key, a side key and a short-cut key which are set up in order to perform a specific application. Moreover, the input unit 320 transmits a key signal which is input in association with the user setting and the function control of the portable terminal to the first controller 120 and the second controller 220.

The storage unit 330 stores downloaded contents, data generated by a user, and an application program necessary for functional operations of the portable terminal. The storage unit 330 may include a program area and a data area. Here, the program area stores an Operating System (OS) for booting the portable terminal which includes an application program necessary for the function of other options of the portable terminal. Moreover, the data area is an area in which the user data according to the use of portable terminal is stored.

In order for the communications module (or controller), in which a specific smart card module is connected, to be set up as a master device, identification information for identifying the specific smart card module is stored in the storage unit 330. As described above, the identification information includes a device identifier and a service identifier. For example, the device identifier may be an ICCID and the service identifier may be a telephone number. In an exemplary implementation, the storage unit 330 may store a telephone number (hereinafter, "main telephone number") that the user commonly uses. Moreover, the storage unit 330 may store the main telephone number according to a priority.

The display unit 340 displays on a display screen a signal received from one of the first controller 120 and the second controller 220. The display unit 340 visually provides a menu of the portable terminal, user data input, function setting information and various information to the user. The display unit 340 may be formed as a Liquid Crystal Display (LCD). If the LCD is formed as a touch screen, the display unit 340 may perform a portion or an entire function of the input unit 320.

The first controller 120 and the second controller 220 commonly use the common module 300. At this time, one of the first controller 120 and the second controller 220 is operated as a master device, while the other is operated as a slave device. The controller which operates as a master device may directly control the common module 300, while the controller which operates as a slave device may control the common module 300 through the controller which operates as a master device. Moreover, the controller which operates as a master device may control the controller which operates as a slave device.

For example, assuming that the first controller 120 is a master device and the second controller 220 is a slave device, the first controller 120 directly controls the common module 300. That is, through direct control, the first controller 120 may control overall operations of the dual standby portable terminal and the flow of signals between internal blocks of the portable terminal. For example, the first controller 120 controls each function of the portable terminal according to an input signal (e.g., key input signal on the touch screen) input to the input unit 320, and may display information including a current state according to the function performing and a user menu through the display unit 340, or may store information in the storage unit 330.

More particularly, if a user selects an image communications key, the first controller 120 may control the second controller 220 while simultaneously performing the call connection of the first communications module 100 through the first wireless communications unit 110, so that the call connection of the second communications module 200 may be performed through the second wireless communications unit 210. That is, the controller which operates as a master device may newly determine a master device based on a telephone number stored in the smart card module connected to the first controller 120 and the second controller 220, when the power supply of the portable terminal is turned on.

For example, when the telephone number of the second smart card module 420 connected to the second controller 220 is a preset main telephone number while the first controller 120 is set as a master device, the first controller 120 sets the second controller 220 as a master device and sets the first controller 120 itself as a slave device. Then, the second controller 220 which is set as a master device proceeds to a booting sequence. Although not illustrated in the drawings, the portable terminal may further include units having additional functions as a common module, such as a broadcasting signal reception module, a camera module, a charging terminal, and a digital sound playing module, such as a Moving Pictures Expert Group Audio Layer-3 (MP3) module.

Hereinafter, the setup method of a smart card module will be illustrated in Table 1 according to an exemplary embodiment of the present invention.

TABLE 1

| smart card module | identification information (telephone number) | setup |
| --- | --- | --- |
| smart card module 1 | telephone number 1 | |
| smart card module 2 | telephone number 2 | main telephone number |
| smart card module 3 | telephone number 3 | |

Referring to Table 1, it is assumed herein that a user made a contract with three mobile communications service companies and is provided with a smart card module including smart card module 1 to smart card module 3 from each service company. Each smart card module stores identification information that a corresponding service company provides. As described above, the identification information includes the device identifier and the service identifier. In an exemplary implementation, the identification information may be a telephone number.

The portable terminal provides a screen interface for registering a corresponding telephone number through an additional menu. Accordingly, the user may register the corresponding telephone number. Moreover, the portable terminal provides a menu which sets one of the registered telephone numbers as a main telephone number to the user. Accordingly, the user may set one of telephone number 1 to telephone number 3 as a main telephone number.

In Table 1, it is shown that telephone number 2 is registered as a main telephone number. Accordingly, the telephone number which the user registered and the main telephone number are stored in the storage unit 330. In a different example, Table 2 illustrates the smart card module setup method.

TABLE 2

| smart card module | identification information (telephone number) | priority |
|---|---|---|
| smart card module 1 | telephone number 1 | 2 |
| smart card module 2 | telephone number 2 | 1 |
| smart card module 3 | telephone number 3 | 3 |

Referring to Table 2, it is assumed herein that the user made a contract with three mobile communications service companies and is provided with a smart card module including smart card module 1 to smart card module 3 from each service company. Each smart card module stores identification information that a corresponding service company provides. As described above, the identification information includes the device identifier and the service identifier. In an exemplary implementation, the identification information may be a telephone number. The portable terminal provides a screen interface for registering a corresponding telephone number through an additional menu.

Accordingly, the user may store the corresponding telephone number in the storage unit 330. Moreover, the portable terminal provides a menu to the user that classifies the stored telephone number according to a priority. Accordingly, the user may classify telephone number 1 to telephone number 3 with the priority. In Table 2, the priority was given in the order of telephone number 2, 1, and 3, for example. Accordingly, the telephone number which the user registered and the priority of each telephone number are stored in the storage unit 330. A method for setting the smart card module is described above. A smart card module sensing method of the portable terminal will be described below.

Figure 3:
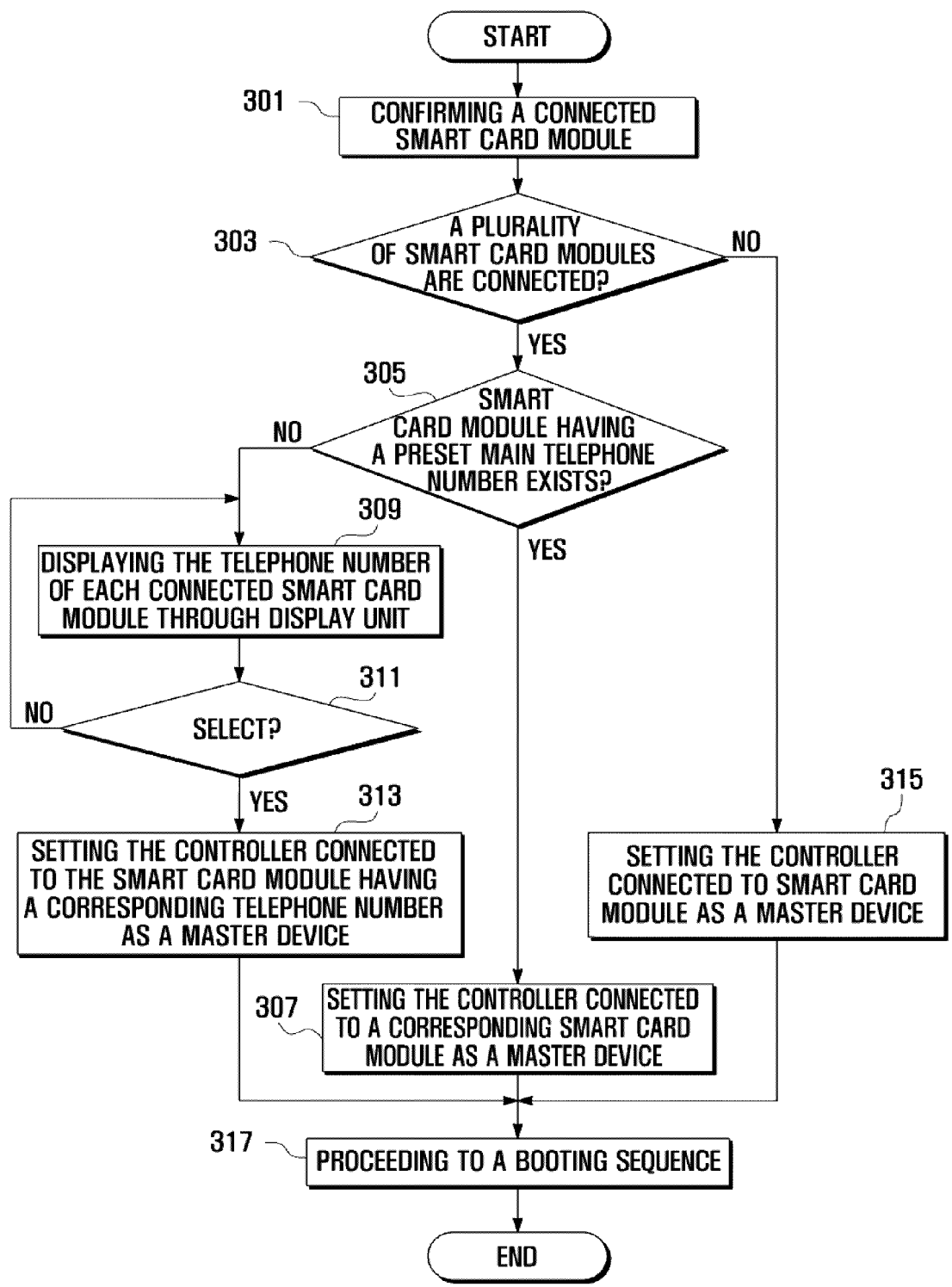
FIG. 3 is a flowchart illustrating a method for sensing a smart card of a portable terminal according to an exemplary embodiment of the present invention.

FIG. 3 is a flowchart illustrating a method for sensing a smart card of a portable terminal according to an exemplary embodiment of the present invention. In FIG. 3, it is assumed herein that the first communications module 100 is set as a master device.

Referring to FIG. 3, in a state where the power supply of portable terminal is turned off, the smart card module may be replaced by the user. After the replacement of the smart card module, when the power supply of portable terminal is turned on by the key input of the user, the first controller 120 confirms the smart card module connected to the first controller 120 and the second controller 220 in step 301, and determines whether a plurality of smart card modules are connected in step 303. As a result of the determination, when a plurality of smart card modules are connected, the controller proceeds to step 305, and when one smart card module is connected, the controller proceeds to step 315, so that the controller connected to the smart card module is set as a master device. That is, if one smart card module is connected, the controller to which the smart card module is connected among the first controller 120 and the second controller 220 is set as a master device.

The first controller 120 determines whether a smart card module having a preset main telephone number exists among the connected smart card module in step 305. As a result of the determination in step 305, if the smart card module having a preset main telephone number exists, the controller connected to the corresponding smart card module is set as a master device in step 307.

For example, referring to Table 1, assuming that the smart card module 1 is connected to the first controller 120 and the smart card module 2 is connected to the second controller 220, the first controller 120 sets the second controller 220 as a master device. Moreover, assuming that the smart card module 2 is connected to the first controller 120 and the smart card module 3 is connected to the second controller 220, the first controller 120 maintains a master device.

As a result of the determination in step 305, if the smart card module having a preset main telephone number does not exist, the telephone number of each connected smart card module is displayed through the display unit 340 in step 309, such that the user may select a telephone number to be used as a main telephone number. When the user selects one of the displayed telephone numbers, the first controller 120 senses the selection in step 311, and converts the controller connected to the smart card module having the corresponding telephone number, into a master device in step 313.

As described above, after the master device is determined, the controller which is a master device among the first controller 120 and the second controller 220 proceeds to a booting sequence in step 317. As described above, if the smart card module set by the user is connected to one communications module among the first communications module 100 and the second communications module 200, the communications module connected to the corresponding smart module becomes a master device and proceeds to a booting sequence.

As described above, the telephone number may be used as identification information for distinguishing the smart card module. However, the identification information for distinguishing the smart card module is not limited thereto. That is, the ICCID for distinguishing the smart card module may also be used. Hereinafter, the smart card module sensing method of a portable terminal according to an exemplary embodiment of the present invention will be described. As shown in Table 2, the case in which a priority is given to each smart card module will also be described.

FIG. 4 is a flowchart illustrating a method for sensing a smart card of a portable terminal according to an exemplary embodiment of the present invention.

Referring to FIG. 4, it is assumed herein that the first communications module 100 is set as a master device. In a state where the power supply of portable terminal is turned off, the smart card module may be replaced by a user. Then, if the power supply of the portable terminal is turned on by the key input of the user, the first controller 120 confirms the smart card module connected to the first controller 110 and the second controller 120 in step 401, and determines whether a plurality of smart card modules are connected in step 403.

As a result of the determination, when a plurality of smart card modules are connected, the controller proceeds to step 405, and when one smart card module is connected, the controller proceeds to step 415, so that the controller connected to the smart card module is set as a master device. That is, if one smart card module is connected, the controller to which the smart card module is connected among the first controller 120 and the second controller 220 is set as a master device. The first controller 120 determines whether a smart card module having a telephone number in which a priority is given exists among the connected smart card module in step 405.

As a result of the determination in step 405, if the smart card module having a telephone number in which a priority is given exists, the first controller 110 proceeds to step 407, and if the smart card module having a telephone number in which a priority is given does not exist, the first controller proceeds to step 409. As a result of the determination in step 405, if the smart card module having a telephone number in which a priority is given exists, the controller connected to the smart card module having the highest priority among the smart card module connected to the first controller 120 and the second controller 220 is set as a master device in step 407.

For example, referring to Table 2, assuming herein that the smart card module 3 is connected to the first controller 120 and the smart card module 1 is connected to the second controller 220, the first controller 120 sets the second controller 220 as a master device since the priority of the smart card module 1 is higher than the priority of the smart card module 3. Moreover, assuming herein that the smart card module 1 is connected to the first controller 120 and the smart card module 2 is connected to the second controller 220, the first controller 120 maintains a master device since the priority of the smart card module 2 is higher than the priority of the smart card module 1.

As a result of the determination in step 405, if the smart card module having a telephone number in which a priority is given does not exist, the telephone number of each connected smart card module is displayed through the display unit 340 in step 409, such that the user may select a telephone number to be used as a main telephone number. When the user selects one of the displayed telephone numbers, the first controller 120 senses the selection in step 411, and converts the controller connected to the smart card module having the corresponding telephone number, into a master device in step 413.

As described above, after the master device is determined, the controller which is a master device among the first controller 120 and the second controller 220 proceeds to a booting sequence in step 417. If the smart card module is connected according to a priority set by the user, the communications module connected to the smart card module having the highest priority among the first communications module 100 and the second communications module 200 becomes a master device and proceeds to a booting sequence. In an exemplary implementation, the telephone number may be used as identification information for distinguishing the smart card module. However, the identification information for distinguishing the smart card module is not limited thereto. That is, the ICCID for distinguishing the smart card module may also be used.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for sensing a smart card of a portable terminal, the apparatus comprising:
    a plurality of smart card modules comprising identification information for receiving a specific wireless communications protocol; and
    at least two communications modules, each communication module having a smart card module among the smart card modules connected and performs wireless communications according to the connected smart card module,
    wherein one of the at least two communications modules connected to a smart card module having identification information corresponding to preset identification information is set as a master device,
    wherein one of the at least two communications modules is selected by a user as a master device, when a communications module connected to a smart card module for storing preset identification information does not exist.

2. The apparatus of claim 1, wherein one of the at least two communications modules connected to a smart card module having a high preset priority is set as a master device.

3. The apparatus of claim 1, wherein one of the at least two communications modules is selected by a user as a master device, when a communications module connected to a smart card module having a high preset priority does not exist.

4. The apparatus of claim 1, further comprising a common module directly connected to at least one of the at least two communications modules, for performing input and output interfacing according to the control of the communications module which is set as a master device.

5. The apparatus of claim 1, wherein the identification information comprises a service identifier.

6. The apparatus of claim 5, wherein the service identifier comprises a main telephone number.

7. The apparatus of claim 1, wherein the identification information comprises a device identifier.

8. The apparatus of claim 7, wherein the device identifier comprises an Integrated Circuit Card Identification (ICCID).

9. The apparatus of claim 1, wherein the wireless communication module selected as the master device controls a common module of the apparatus and the wireless communication module not selected as the master device.

10. A method for sensing a smart card of a portable terminal comprising at least two communications modules, the method comprising:
    confirming a smart card module connected to each of the at least two communications modules when a power supply of the portable terminal is turned on;
    determining whether a smart card module having identification information corresponding to preset identification information exists among the connected smart card modules;
    setting a communication module connected to the smart card module having the identification information corresponding to the preset identification information as a master device; and
    setting a communications module selected by a user as a master device, when a communication module connected to a smart card module for storing preset identification information does not exist.

11. The method of claim 10, wherein the preset identification information comprises a main telephone number.

12. The method of claim 10, wherein the selected master device performs a booting sequence.

13. The method of claim 10, further comprising setting a communications module selected by a user as a master device, when the smart card module having a preset priority does not exist.

14. The method of claim 10, further comprising setting a communications module connected to the smart card module having a highest priority as a master device.

* * * * *